United States Patent
Arora et al.

(10) Patent No.: US 11,794,753 B2
(45) Date of Patent: Oct. 24, 2023

(54) EYES-ON-ROAD DETECTION

(71) Applicant: Ford Global Technologies, LLC, Dearborn, MI (US)

(72) Inventors: Anita Arora, Bloomfield Hills, MI (US); Kenneth James Boyd, Ann Arbor, MI (US); Jay Patel, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 17/226,496

(22) Filed: Apr. 9, 2021

(65) Prior Publication Data
US 2022/0324457 A1 Oct. 13, 2022

(51) Int. Cl.
*B60W 40/08* (2012.01)
*B60W 50/16* (2020.01)
*B60W 30/12* (2020.01)

(52) U.S. Cl.
CPC .......... *B60W 40/08* (2013.01); *B60W 30/12* (2013.01); *B60W 50/16* (2013.01); *B60W 2520/10* (2013.01); *B60W 2520/14* (2013.01); *B60W 2540/18* (2013.01); *B60W 2540/20* (2013.01); *B60W 2540/225* (2020.02); *B60W 2552/20* (2020.02)

(58) Field of Classification Search
CPC ...... B60W 40/08; B60W 30/12; B60W 50/16; B60W 2552/20; B60W 2540/225; B60W 2520/10; B60W 2520/14; B60W 2540/18; B60W 2540/20
See application file for complete search history.

(56) References Cited

U.S. PATENT DOCUMENTS

| | | | |
|---|---|---|---|
| 8,487,775 B2 | 7/2013 | Victor et al. | |
| 10,223,602 B2 | 3/2019 | Paszkowicz et al. | |
| 10,752,253 B1 | 8/2020 | Nath et al. | |
| 2019/0143993 A1* | 5/2019 | Aoi | G06V 20/597 340/439 |
| 2019/0147267 A1* | 5/2019 | Aizawa | G06V 20/597 340/576 |
| 2020/0247416 A1* | 8/2020 | Tsuji | B60W 50/10 |
| 2021/0295070 A1* | 9/2021 | Takao | B60W 60/0051 |
| 2022/0032939 A1* | 2/2022 | Urano | B60W 50/04 |

* cited by examiner

*Primary Examiner* — Nicholas Kiswanto
*Assistant Examiner* — Jamal A Shah
(74) *Attorney, Agent, or Firm* — Frank A. MacKenzie; Bejin Bieneman PLC (57) ABSTRACT

A computer includes a processor and a memory storing instructions executable by the processor to receive data indicating a gaze direction of an occupant of the vehicle; determine whether the gaze direction is in a permitted area defined by a boundary, the permitted area being in a forward direction of travel of the vehicle; laterally adjust the boundary of the permitted area based on a speed of the vehicle and based on data indicating turning of the vehicle; and control the vehicle based on whether the gaze direction is in the permitted area.

19 Claims, 6 Drawing Sheets

EYES-ON-ROAD DETECTION

BACKGROUND

Some vehicles are equipped to perform a lane-keeping operation, i.e., steering the vehicle to maintain a lateral position of the vehicle near a center of a lane of travel and/or away from boundaries of the lane. Typically, a computer(s) on board the vehicle uses image data from a forward-facing camera to detect the boundaries of the lane. The computer(s) instructs a steering system of the vehicle to actuate to turn the wheels based on the detected boundaries of the lane.

DETAILED DESCRIPTION

The system described herein can control a vehicle in a lane-keeping operation, control of the vehicle during the lane-keeping operation including providing outputs to a human operator related to the lane-keeping operation. Where a human operator of the vehicle may not steer the vehicle during the lane-keeping operation, the human operator should be prepared to take over control of the steering. Accordingly, a vehicle system can detect whether an operator's gaze direction is outside a permitted area while the vehicle is performing a lane-keeping operation. The permitted area is in a forward direction of travel of the vehicle. The system can provide output based on an operator's gaze being outside a permitted area. For example, while the vehicle is being autonomously steered, the system can encourage the operator to keep their eyes on the road by outputting an alert if the gaze direction of the operator is outside the permitted area for a time threshold. Alternatively or additionally, the system can control the vehicle, e.g., by outputting an alert, when the vehicle is not performing a lane-keeping operation, e.g., when the vehicle is being manually steered.

Advantageously, the system provides an improved technique for gaze monitoring and detecting by dynamically changing the permitted area for an operator's gaze. For example, as the vehicle travels along a road, a permitted area for an operator's gaze can be dynamically changed or adjusted based on a speed of the vehicle and whether the vehicle is turning or will turn soon. For example, the permitted area can expand leftward if the vehicle is traveling over a road that curves to the left. As the speed increases on the curve, the permitted area can expand leftward to a greater degree, permitting the operator to look farther ahead on the road while still having their gaze direction in the permitted area. The dynamic adjustment of the permitted area can include an area in the permitted area while that area is relevant to the operator and exclude the area when it is not relevant. Thus, systems such as a lane-keeping system or other driver-monitoring system that use gaze monitoring are improved, e.g., by fewer unnecessary interruptions to the system and/or timelier and/or more targeted outputs related to a detected gaze direction.

A computer includes a processor and a memory storing instructions executable by the processor to receive data indicating a gaze direction of an occupant of a vehicle, determine whether the gaze direction is in a permitted area defined by a boundary, laterally adjust the boundary of the permitted area based on a speed of the vehicle and based on data indicating turning of the vehicle, and control the vehicle based on whether the gaze direction is in the permitted area. The permitted area is in a forward direction of travel of the vehicle.

Controlling the vehicle may include outputting an alert to the occupant in response to the gaze direction being continuously outside the permitted area for a time threshold. The alert may be at least one of audible, visual, and haptic.

The instructions may further include instructions to adjust the time threshold based on the speed of the vehicle and based on the data indicating turning of the vehicle. The time threshold may have an inverse relationship with the speed of the vehicle.

The boundary may include a first portion on a lateral side toward which the vehicle is turning, the first portion may be at a default position when the vehicle is traveling straight, and laterally adjusting the boundary of the permitted area may include moving the first portion of the boundary a distance from the default position in a direction toward which the vehicle is turning. The distance may have a positive relationship with a yaw rate of the vehicle.

The distance may have an inverse relationship with the speed of the vehicle.

In response to the data indicating turning of the vehicle being a lane-change instruction or an active status of a turn indicator, the distance may be a preset distance. In response to the data indicating turning of the vehicle being the lane-change instruction or the active status of the turn indicator, the permitted area may include a side-view mirror of the vehicle.

The boundary may include a second portion on a lateral side away from which the vehicle is turning, and laterally adjusting the boundary of the permitted area may include keeping the second portion of the boundary stationary while the vehicle is turning.

The boundary may include a second portion on a lateral side away from which the vehicle is turning, and laterally adjusting the boundary of the permitted area includes moving the second portion of the boundary in the direction toward which the vehicle is turning.

The data indicating turning of the vehicle may include a steering-wheel angle.

The data indicating turning of the vehicle may include a lane-change instruction.

The data indicating turning of the vehicle may include a status of a turn indicator. The status of the turn indicator may indicate turning of the vehicle when the status is active up to a time threshold, and the status of the turn indicator may not indicate turning when the status is active for longer than the time threshold.

The instructions may further include instructions to vertically adjust the boundary of the permitted area based on a distance to an intersection. Vertically adjusting the boundary of the permitted area may be based on a grade angle of a road on which the vehicle is traveling.

The instructions may further include instructions to instruct a steering system of the vehicle to perform a lane-keeping operation, and controlling the vehicle based on whether the gaze direction is in the permitted area may occur while performing the lane-keeping operation.

A method includes receiving data indicating a gaze direction of an occupant of a vehicle, determining whether the gaze direction is in a permitted area defined by a boundary, laterally adjusting the boundary of the permitted area based on a speed of the vehicle and based on data indicating turning of the vehicle, and controlling the vehicle based on whether the gaze direction is in the permitted area. The permitted area is in a forward direction of travel of the vehicle.

With reference to the Figures, wherein like numerals indicate like parts throughout the several views, a computer 102 includes a processor and a memory storing instructions executable by the processor to instruct a steering system 104 of a vehicle 100 to perform a lane-keeping operation; receive data indicating a gaze direction of an occupant of the vehicle 100; determine whether the gaze direction is in a permitted area A defined by a boundary B, the permitted area A being in a forward direction of travel of the vehicle 100; laterally adjust the boundary B of the permitted area A based on a speed of the vehicle 100 and based on data indicating turning of the vehicle 100; and while performing the lane-keeping operation, control the vehicle 100 based on whether the gaze direction is in the permitted area A.

Figure 1:
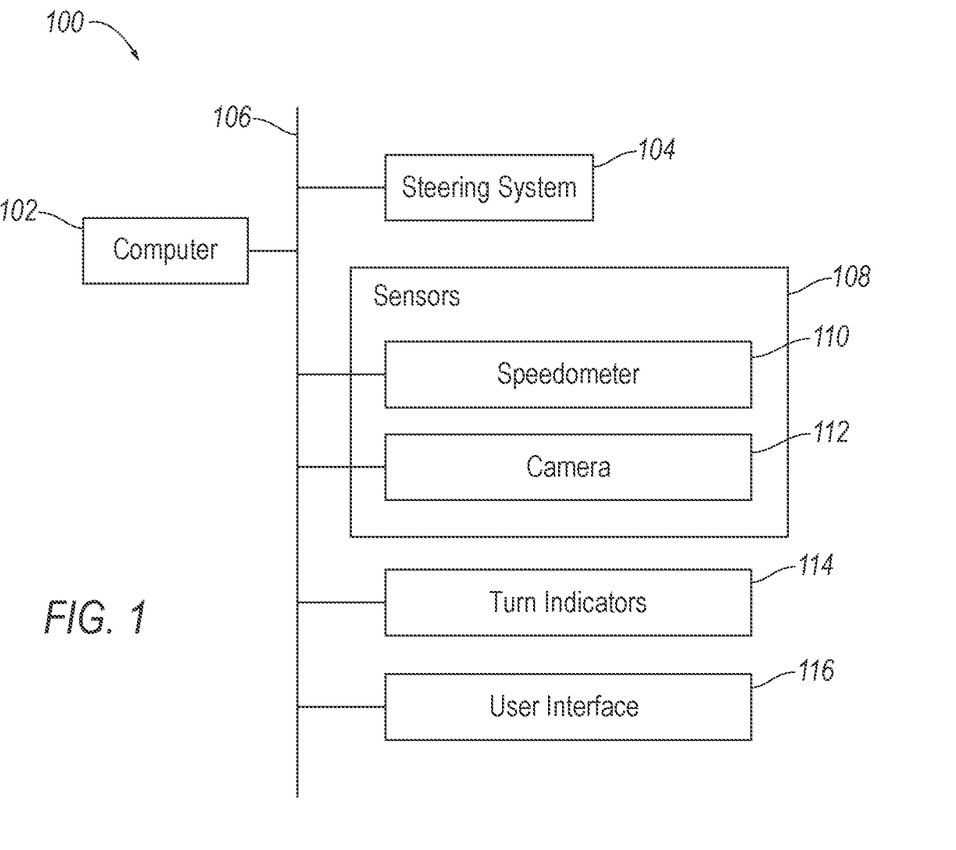
FIG. 1 is a block diagram of an example vehicle.

With reference to FIG. 1, the vehicle 100 may be any passenger or commercial automobile such as a car, a truck, a sport utility vehicle, a crossover, a van, a minivan, a taxi, a bus, etc.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 106 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the steering system 104, sensors 108 including a speedometer 110 and a camera 112, turn indicators 114, a user interface 116, and other components via the communications network 106.

The steering system 104 is typically a conventional vehicle steering subsystem and controls the turning of the wheels. The steering system 104 may be a rack-and-pinion system with electric power-assisted steering, a steer-by-wire system, as both are known, or any other suitable system. The steering system 104 can include an electronic control unit (ECU) or the like that is in communication with and receives input from the computer 102 and/or a human operator. The human operator may control the steering system 104 via, e.g., a steering wheel.

The sensors 108 may provide data about operation of the vehicle 100, for example, wheel speed, wheel orientation, and engine and transmission data (e.g., temperature, fuel consumption, etc.). The sensors 108 may detect the location and/or orientation of the vehicle 100. For example, the sensors 108 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 108 may detect the external world, e.g., objects and/or characteristics of surroundings of the vehicle 100, such as other vehicles, road lane markings, railway crossings, traffic lights and/or signs, pedestrians, cyclists, etc. For example, the sensors 108 may include radar sensors, scanning laser range finders, light detection and ranging (LIDAR) devices, and cameras.

The sensors 108 include the speedometer 110. The speedometer 110 may be any sensor suitable for measuring the speed of the vehicle 100, for example, as is known, a mechanical or eddy-current speedometer, or a vehicle speed sensor. A vehicle speed sensor may use a magnetic field detector to count interruptions of a magnetic field by a toothed metal disk disposed on a driveshaft of the vehicle 100.

The sensors 108 include at least one camera 112 aimed at the human operator, i.e., with a field of view encompassing the human operator. For example, the camera 112 can be located on the dashboard and oriented in a vehicle-rearward direction. The camera 112 can detect electromagnetic radiation in some range of wavelengths. For example, the camera 112 may detect visible light, infrared radiation, ultraviolet light, or some range of wavelengths including visible, infrared, and/or ultraviolet light.

The turn indicators 114 are lamps on an exterior of the vehicle 100, e.g., on the corners of the vehicle 100, that are configured to blink to signal an intent to turn the vehicle 100 to other vehicles. The turn indicators 114 have a status that is either active, i.e., blinking, or inactive, i.e., not blinking. The status can be represented by a binary value. The status of the turn indicators 114 can be broadcast over the communications network 106 and is thereby available to the computer 102.

The user interface 116 presents information to and receives information from an occupant of the vehicle 100, e.g., the human operator. The user interface 116 may be located, e.g., on an instrument panel in a passenger cabin 118 of the vehicle 100, distributed over multiple locations, and/or wherever may be readily seen, heard, or felt by the occupant. The user interface 116 may include dials, digital readouts, screens, speakers, vibratory actuators, and so on for providing information to the occupant, e.g., human-machine interface (HMI) elements such as are known. The user interface 116 may include buttons, knobs, keypads, microphone, and so on for receiving information from the occupant.

Figure 2:
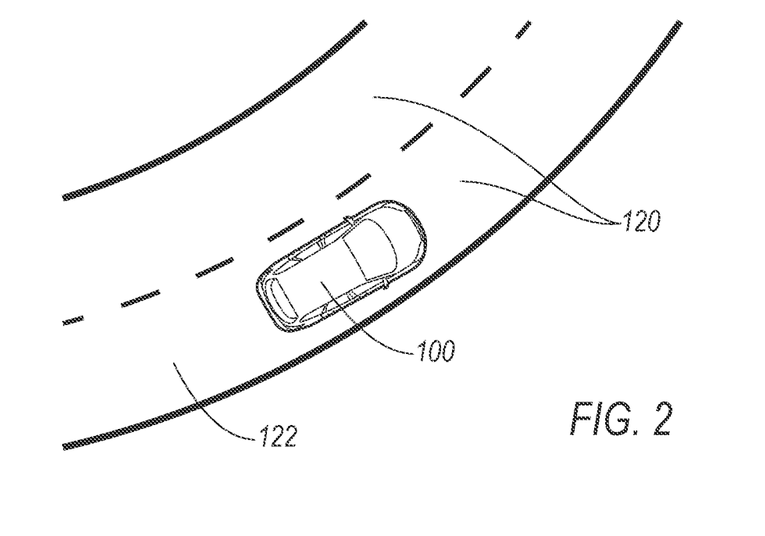
FIG. 2 is a diagram of a vehicle traveling along a lane of a road.

With reference to FIG. 2, the computer 102 can be programmed to perform a lane-keeping operation while traveling along a lane 120 of a road 122. The operator can activate and deactivate the lane-keeping operation, e.g., via the user interface 116. The lane-keeping operation includes steering the vehicle 100, i.e., actuating the steering system 104, to maintain a lateral position of the vehicle 100 in the lane 120, e.g., at a center line of the lane 120 or at least a preset lateral distance away from respective left and right boundaries of the lane 120. The center line is typically an imaginary line in a longitudinal direction of the lane 120 having a same lateral distance to the respective right and left boundaries of the lane 120. For example, the computer 102 can identify the boundaries of the lane 120 using, e.g., an image histogram or image segmentation, as are known, on image data from a forward-facing camera of the sensors 108. The computer 102 can then determine a polynomial equation, e.g., a third-degree polynomial, that predicts points on the center line of the lane 120. The computer 102 can determine a planned curvature for the path followed by the vehicle 100 using the polynomial along with the lateral position and heading of the vehicle 100. The computer 102 can determine a torque for the steering system 104 to apply by minimizing an error between the planned curvature and an actual curvature of the vehicle 100, e.g., by using proportional integral derivative (PID) control. Finally, the computer 102 can instruct the steering system 104 to apply the torque to turn the road wheels.

The lane-keeping operation may include a lane-change operation, e.g., when requested by the operator. The lane-change operation is the vehicle 100 moving from a current lane 120 to an adjacent lane 120 while performing the lane-keeping operation. While the computer 102 is performing the lane-keeping operation, the operator can input a lane-change instruction, e.g., via the user interface 116. The computer 102 can receive data from the sensors 108, e.g., radars positioned on sides of the vehicle 100, to determine whether the adjacent lane 120 is clear. If so, then the computer 102 can determine a polynomial equation describing motion from the current lane 120 to the adjacent lane 120 and proceed as described above for the lane-keeping operation.

With reference to FIGS. 3-6, the permitted area A is a range of possible directions of the gaze of the occupant. As described below with respect to a process 700, the computer 102 uses whether the gaze direction of the operator is in the permitted area A to control the vehicle 100. The range of the permitted area A can be described in two angular dimensions, e.g., the operator tilting their head and/or eyes up and down, and the operator turning their head and/or eyes left and right. The range of the permitted area A can equivalently be described according to locations on a surface of a passenger cabin 118 of the vehicle 100, e.g., a left half of a windshield 124, a rear-view mirror, etc. toward which the gaze direction of the operator can be directed. The permitted area A has a default position when the vehicle 100 is traveling straight on a level grade. The default position of the permitted area A can be chosen to encompass the gaze directions at which the operator is looking at the road 122 when the road is straight and level based on empirical testing, i.e., obtaining measurements of gaze directions of operators in vehicles. For example, the default position of the permitted area A could be a portion of a left half of the windshield 124 extending from the bottom of the windshield 124 partially toward the top of the windshield 124. As described below with respect to the process 700, the permitted area A is adjustable from the default position in various circumstances. The permitted area A is in a forward direction of travel of the vehicle 100, both when in the default position and after adjustments.

Figure 3:
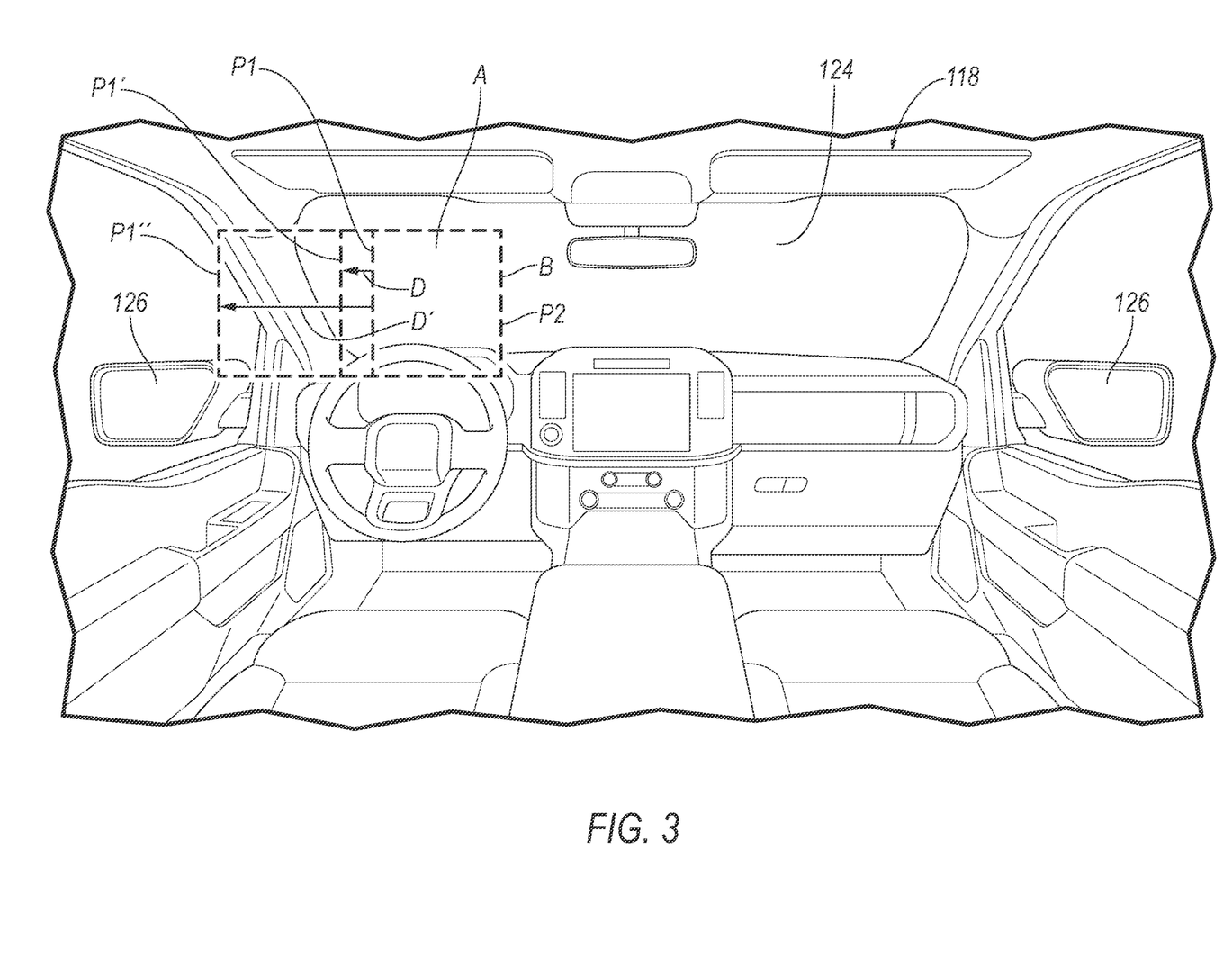
FIG. 3 is a forward-facing view of a passenger cabin of the vehicle showing a first example of adjusting a permitted area for a gaze direction.
Figure 4:
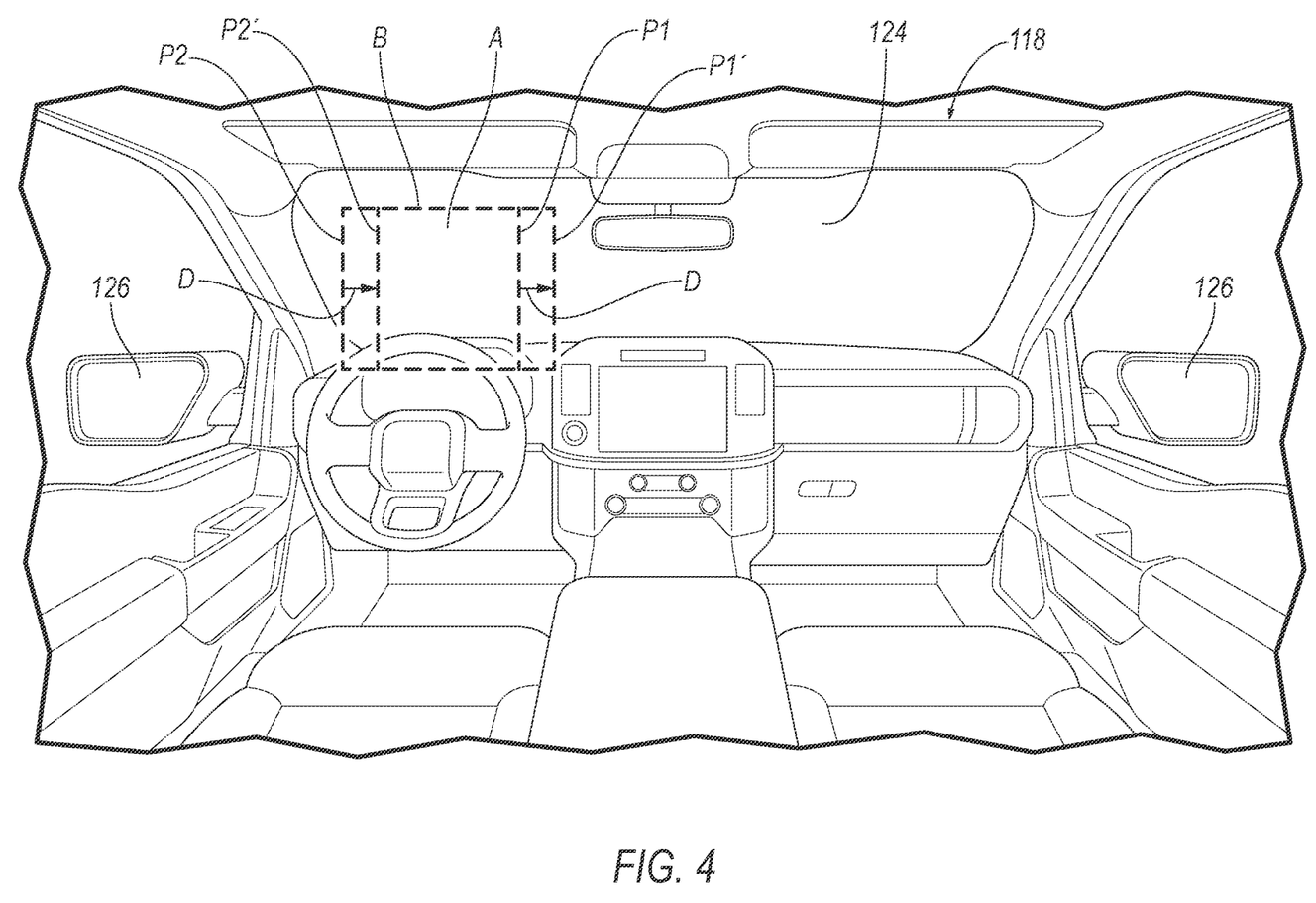
FIG. 4 is a forward-facing view of the passenger cabin showing a second example of adjusting the permitted area.

The permitted area A is defined by the boundary B. The adjustments of the permitted area A can be described in terms of moving portions P1, P2, P3, P4 of the boundary B, with prime (') or double prime (") indicating post-adjustment positions in the Figures. As described further below, FIGS. 3-6 illustrate examples of how the permitted area A can change based on view speed and turning. For example, when the vehicle 100 is turning left, a left lateral portion of the boundary B can move leftward, as shown in the examples of FIGS. 3 and 4. Typically, the permitted area A is a rectangle, and the portions P1, P2, P3, P4 described variously with respect to FIGS. 3-6 are line segments defining one side of the rectangle.

The boundary B of the permitted area A is adjusted based on the speed of the vehicle 100, data indicating turning of the vehicle 100, distance to an intersection, and/or grade angle of the road 122. The data indicating turning of the vehicle 100 can include data indicating that the vehicle 100 is currently turning or will turn soon, e.g., will turn in at most a time threshold before which the computer 102 outputs an alert, as described below with respect to the process 700. The data indicating turning of the vehicle 100 can include the status of the turn indicators 114, a steering-wheel angle, a yaw rate of the vehicle 100, the lane-change instruction for the lane-change operation, GPS data, map data, image data from a forward-facing camera of the sensors 108, etc. For example, the sensors 108 can include, e.g., a torque sensor or a position sensor in the steering system 104, e.g., on a steering column, for reporting the steering-wheel angle. For another example, the computer 102 can determine a current curvature and/or an upcoming curvature of a road on which the vehicle 100 is traveling based on the map data or based on an image histogram or image segmentation of the image data, as described above with respect to the lane-keeping operation.

Figure 5:
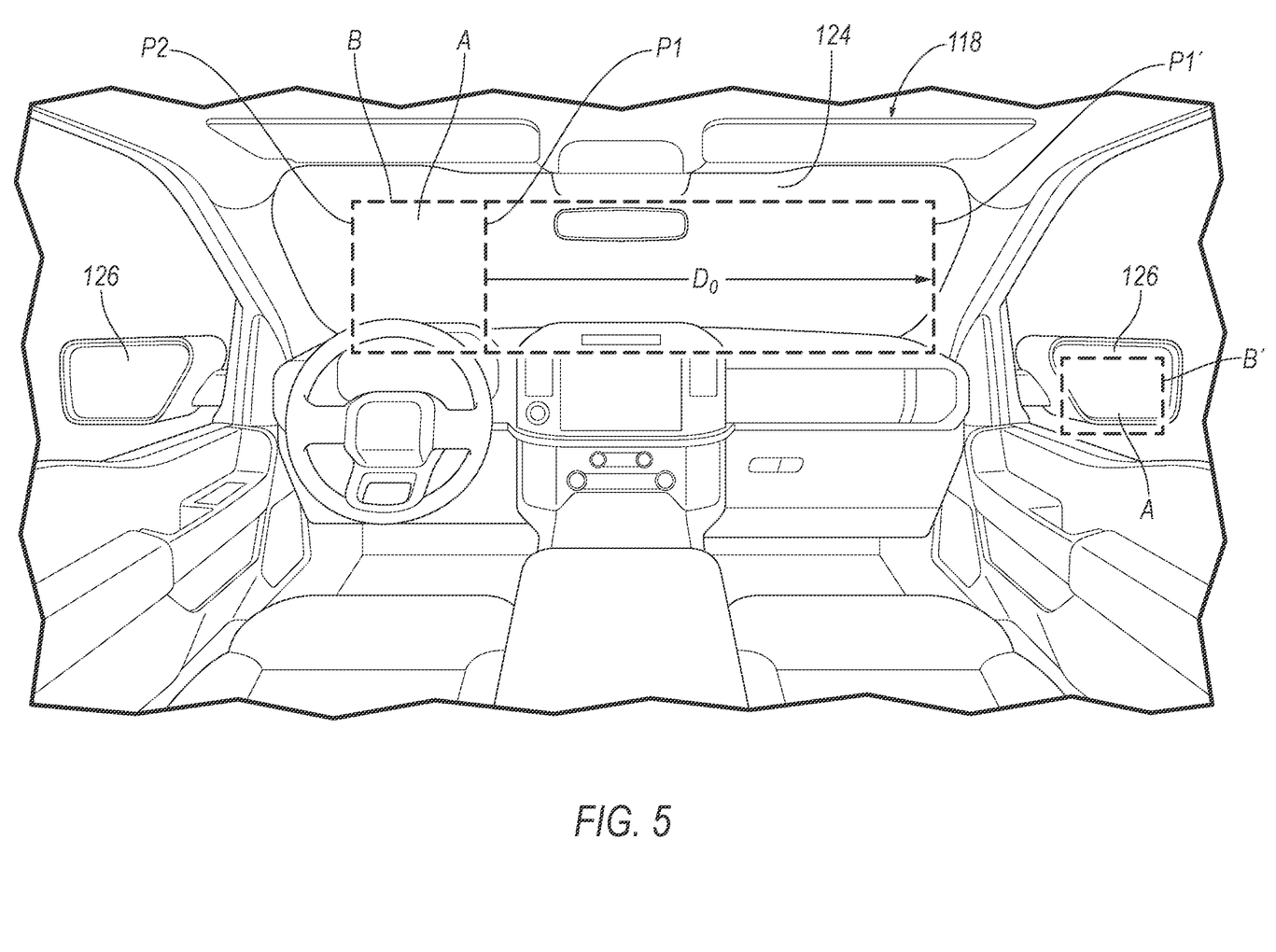
FIG. 5 is a forward-facing view of the passenger cabin showing a third example of adjusting the permitted area.
Figure 6:
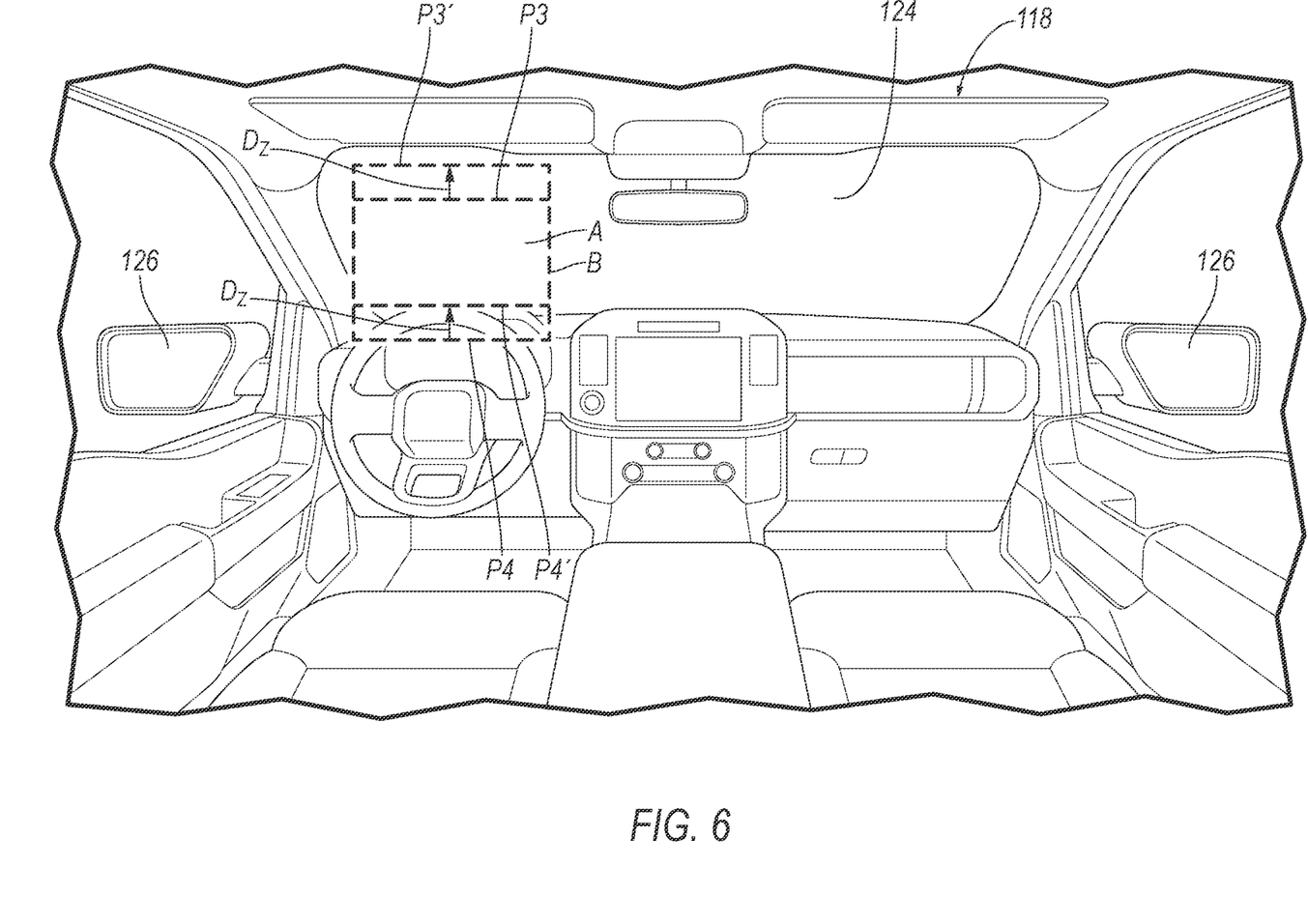
FIG. 6 is a forward-facing view of the passenger cabin showing a fourth example of adjusting the permitted area.

The adjustment of the boundary B can be lateral and/or vertical. If the vehicle 100 is traveling straight and/or will continue to travel straight, the boundary B is laterally maintained at the default position. If the vehicle 100 is on a level grade and is far from an intersection, the boundary B is vertically maintained at the default position. As these conditions are not met, the computer 102 adjusts the boundary B laterally and/or vertically. FIGS. 3 and 4 are two examples of laterally adjusting the boundary B, and FIGS. 5 and 6 are two examples of additional ways to adjust the boundary B that can each be included with either of the examples of Figures A and B. For example, the computer 102 can laterally adjust the boundary B of the permitted area A based on a speed of the vehicle 100 and based on data indicating turning of the vehicle 100, as in the examples of FIG. 3 or 4; the computer 102 can laterally adjust the permitted area A by a preset distance based on the data indicating turning of the vehicle 100 being an active status of the turn indicators 114 or a lane-change instruction, as in the example of FIG. 5; and/or the computer 102 can vertically adjust the permitted area A based on a distance of the vehicle 100 to an intersection, the speed of the vehicle 100, and/or a grade angle of a road 122 on which the vehicle 100 is traveling, as in the example of FIG. 6. These examples will now be described in turn.

With respect to the examples of FIGS. 3 and 4, the computer 102 can laterally adjust the boundary B of the permitted area A by moving a first portion P1 of the boundary B a distance D from the default position. In the example of FIGS. 3 and 4, the boundary B includes the first portion P1 on a lateral side toward which the vehicle 100 is turning, e.g., a left side if the vehicle 100 is turning left, as seen in FIG. 3, or a right side if the vehicle 100 is turning right, as seen in FIG. 4.

The distance D is measured from the default position of the first portion P1 of the boundary B extending in the direction that the vehicle 100 is turning. The distance D is a function of the data indicating that the vehicle 100 is turning, e.g., the yaw rate r, and of the speed V of the vehicle 100, e.g., $D=D(r, V)$. Other data indicating turning, as described above, could be used in addition to or in lieu of the yaw rate r. For example, the function for the distance D can stored in the memory of the computer 102 as a lookup table. When the yaw rate r is zero, i.e., when the vehicle 100 is traveling straight, the first portion P1 is at the default position, i.e., $D(0, V)=0$. The distance D has a positive relationship with the yaw rate r of the vehicle 100; i.e., as the yaw rate r increases, the distance D increases. In other words, the first portion P1 of the boundary B shifts farther when the vehicle 100 turns more sharply. For example, as shown in FIG. 3, the first portion P1 can move a short distance D to a new position P1' when the yaw rate r is small or a large distance D' to a new position P1" when the yaw rate r is large. The distance D has an inverse relationship with the speed V of the vehicle 100; i.e., as the speed V increases, the distance D decreases. In other words, as the vehicle 100 travels faster, the first portion P1 of the boundary B shifts to a lesser degree when the vehicle 100 turns. The function for the distance D, e.g., values for the lookup table for determining the distance D, can be chosen to encompass the gaze directions at which the operator is looking at the road 122 a distance ahead corresponding to a reaction time of the operator when the road curves consistent with various yaw rates r and the vehicle 100 is traveling at various speeds V, based on empirical or experimental measurements of operators in vehicles.

With respect specifically to the example of FIG. 3, the boundary B includes a second portion P2 on a lateral side away from a direction in which the vehicle 100 is turning. The second portion P2 is on the opposite lateral side of the permitted area A as the first portion P1. Laterally adjusting the boundary B can include keeping the second portion P2 of the boundary B stationary at the default position while the vehicle 100 is turning, i.e., while the first portion P1 of the boundary B is moved a distance D from the default position. In other words, as the vehicle 100 turns, the permitted area A widens by the distance D. This example can avoid behavior that is unexpected by the operator such as providing an alert when the operator is looking straight forward.

Alternatively, with respect specifically to the example of FIG. 4, laterally adjusting the boundary B can include moving the second portion P2 of the boundary B in the direction toward which the vehicle 100 is turning, e.g., to the left when the vehicle 100 is turning left. For example, when the first portion P1 moves by the distance D in the direction in which the vehicle 100 is turning to a new position P1', the second portion P2 can move by the distance D in the same direction to a new position P2'. In other words, as the vehicle 100 turns, the permitted area A has a constant width. This example can encourage the operator to turn their gaze in the direction in which the vehicle 100 is turning. A manufacturer of the vehicle 100 can choose which one of the examples of FIGS. 3 and 4 to install by testing a likelihood of the operator continuing to look forward during a turn, how operators respond to receiving alerts when looking forward, and customer preferences about such alerts.

With respect to the example of FIG. 5, in response to the data indicating turning of the vehicle 100 being the lane-change instruction or the active status of the turn indicators 114, the computer 102 laterally adjusts the boundary B of the permitted area A by moving the first portion P1 of the boundary B the distance D from the default position to a new position P1', and the distance D is a preset distance, i.e., $D=D_0$. The preset distance $D_0$ is a value stored in memory. The preset distance $D_0$ can be chosen to encompass a view of the adjacent lane 120 into which the vehicle 100 is moving. The distance D can be set to different preset distances depending on whether the vehicle 100 is changing lanes 120 to the left or to the right, i.e., $D_{OL} \neq D_{OR}$. Additionally, the permitted area A can include a side-view mirror 126, e.g., the side-view mirror 126 on a side of the vehicle 100 toward which the vehicle 100 is turning. For example, the permitted area A can be noncontiguous, with a portion defined by a second boundary B' encompassing the side-view mirror 126 spaced from a main portion of the permitted area A. The portion of the permitted area A defined by the second boundary B' can be rectangular. In the other examples, the permitted area A is contiguous.

With respect to the example of FIG. 6, the computer 102 can vertically adjust the permitted area A based on the distance of the vehicle 100 to an intersection, the speed of the vehicle 100, and/or a grade angle of a road 122 on which the vehicle 100 is traveling. The intersection can be limited to intersections having stoplights, i.e., intersections at which the operator will need to look upward to see a traffic signal. The computer 102 can vertically adjust the permitted area A by moving a third portion P3 of the boundary B a distance $D_z$ from the default position. The boundary B includes the third portion P3 on a top side of the permitted area A. The distance $D_z$ is measured from the default position of the third portion P3 of the boundary B. The distance $D_z$ is a function of the distance X to an intersection, the speed V of the vehicle 100, and a grade angle $\theta$ of the road 122, e.g., $D_z=D_z(X, V, \theta)$. When the distance X from the vehicle 100 to the next intersection is greater than a threshold distance $X_0$, the distance $D_z$ is zero, i.e., $D_z(X>X_0, V, \theta)=0$. The distance $D_z$ has an inverse relationship with the distance X, i.e., as the distance X decreases, the distance $D_z$ increases. In other words, as the vehicle 100 nears the intersection, the third portion P3 moves farther up. The distance $D_z$ has a positive relationship with the grade angle $\theta$, i.e., as the grade angle $\theta$ increases, the distance $D_z$ increases. Additionally or alternatively, the distance $D_z$ can be a function of a rate of change of the grade $d\theta/dx$, e.g., a transition from flat to an upward or downward grade, and/or a function of a travel distance to a grade having at least a specific steepness, e.g., to a beginning of a hill or descent. The boundary B includes a fourth portion P4 on a bottom side of the permitted area A. Vertically adjusting the permitted area A can include keeping the fourth portion P4 of the boundary B stationary at the default position while the third portion P3 is moved the distance $D_z$ from the default position, i.e., the permitted area A growing taller. Alternatively, as shown in FIG. 6, when the third portion P3 of the boundary B moves by the distance $D_z$ to a new position P3', vertically adjusting the permitted area A can include moving the fourth portion P4 of the boundary B by the distance $D_z$ to a new position P4', i.e., the permitted area A has a constant height.

For another example, the computer 102 can laterally adjust the boundary B of the permitted area A by moving the first portion P1 or second portion P2 of the boundary B the distance D from the default position in response to detecting a nonvehicle road user, e.g., a pedestrian or cyclist. The distance D can be chosen based on a position of the nonvehicle road user so that the permitted area A includes the gaze direction of the operator being directed at the nonvehicle road user.

Figure 7:
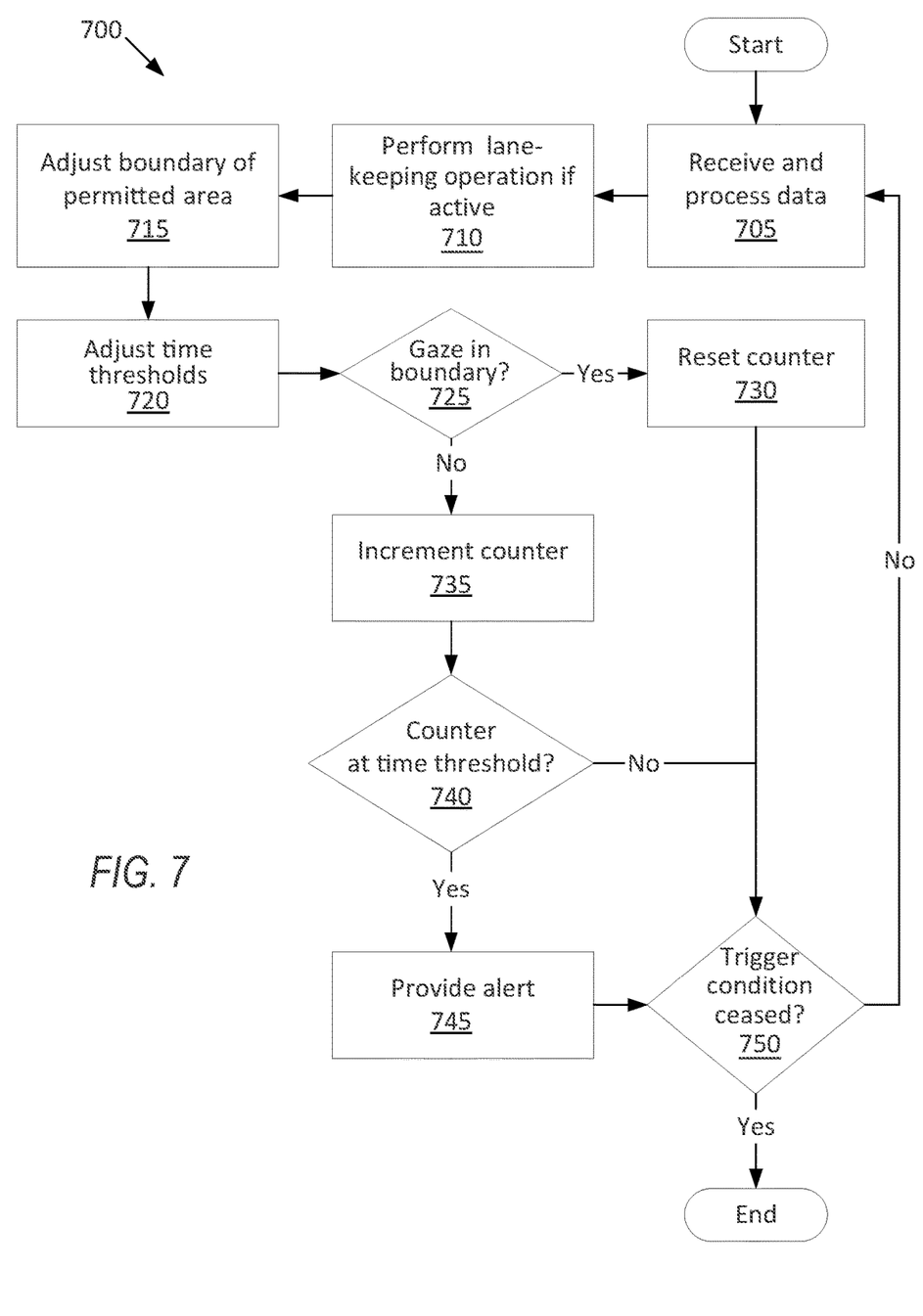
FIG. 7 is a process flow diagram of an example process for adjusting the permitted area.

FIG. 7 is a process flow diagram illustrating an exemplary process 700 for adjusting the permitted area A. The memory of the computer 102 stores executable instructions for performing the steps of the process 700 and/or programming can be implemented in structures such as mentioned above. The process 700 is started by the computer 102 receiving an input to that a trigger condition has occurred, i.e., a condition during which a gaze direction is monitored, e.g., the lane-keeping operation is activated, the vehicle 100 is shifted into a forward gear, the vehicle 100 is traveling with a positive speed, etc.

As a general overview of the process 700, while the trigger condition continues, the computer 102 receives data, performs the lane-keeping operation if applicable, adjusts the boundary B of the permitted area A, and adjusts time thresholds for providing an alert. The boundary B and the time thresholds can be adjusted based on the speed of the vehicle 100, data indicating turning of the vehicle 100, distance to an intersection, and/or grade angle of the road 122. The computer 102 controls the vehicle 100 based on whether the gaze direction is outside the adjusted permitted area A. For example, when the gaze direction of the operator is outside the permitted area A, the computer 102 increments a counter and provides an alert to the operator whenever the counter reaches one of a plurality of time thresholds. The computer 102 resets the counter when the gaze direction is within the permitted area A or, if an alert has been outputted, within the permitted area continuously for a resumption time threshold. The process 700 ends when the computer 102 receives an input that the trigger condition is no longer occurring.

The process 700 begins in a block 705, in which the computer 102 receives and processes data from the sensors 108 and data of the status of the turn indicators 114. The data from the sensors 108 includes data from a forward-facing camera of the sensors 108 of an area in front of the vehicle 100, to which the computer 102 can apply the image histogram or image segmentation discussed above. The data includes the speed of the vehicle 100 from the speedometer 110. The data includes the data indicating turning of the vehicle 100, e.g., the status of the turn indicators 114, a steering-wheel angle, a yaw rate of the vehicle 100, the lane-change instruction for the lane-change operation, GPS data, map data, image data from a forward-facing camera of the sensors 108, etc. The data includes image data from the camera 112 that is aimed at the operator of the vehicle 100. The computer 102 can process the image data to determine the gaze direction of the operator. For example, the computer 102 can detect the face in the image data from the camera 112, e.g., by using any suitable facial-detection technique, e.g., knowledge-based techniques such as a multiresolution rule-based method; feature-invariant techniques such as grouping of edges, space gray-level dependence matrix, or mixture of Gaussian; template-matching techniques such as shape template or active shape model; or appearance-based techniques such as eigenface decomposition and clustering, Gaussian distribution and multilayer perceptron, neural network, support vector machine with polynomial kernel, a naive Bayes classifier with joint statistics of local appearance and position, higher order statistics with hidden Markov model, or Kullback relative information. Then the computer 102 can use outputs produced as a byproduct of the facial detection that indicate the gaze direction.

Next, in a block 710, if the trigger condition was activating the lane-keeping operation, the computer 102 actuates the steering system 104 to perform the lane-keeping operation as described above.

Next, in a block 715, the computer 102 adjusts the boundary B of the permitted area A based on the speed of the vehicle 100, data indicating turning of the vehicle 100, distance to an intersection, and/or grade angle of the road 122, as described above with respect to FIGS. 3-6.

Next, in a block 720, the computer 102 adjusts the time threshold(s) $T_i$ based on the speed V of the vehicle 100 and based on the data indicating turning of the vehicle 100. A time threshold $T_i$ is a length of time that the operator can have their gaze direction outside the permitted area A before the computer 102 outputs an alert. The computer 102 can be programmed to have multiple time thresholds $T_i$, e.g., a first time threshold $T_1$ for a first alert, a second time threshold $T_2$ for a second alert, etc. The time thresholds $T_i$ can have default values, e.g., $T_{1def}$=5 seconds for a first alert, $T_{2def}$=8 seconds for a second alert (i.e., 3 seconds after the first alert), and $T_{3def}$=13 seconds for a third alert (i.e., 5 seconds after the second alert). The time thresholds $T_i$ are a function of the data indicating that the vehicle 100 is turning, e.g., the yaw rate r, and of the speed V of the vehicle 100, e.g., $T_i(r, V)$ for i=1, 2, 3. The time thresholds $T_i$ can have an inverse relationship with the yaw rate r of the vehicle 100; i.e., as the yaw rate r increases, the time thresholds $T_i$ decrease. The time thresholds $T_i$ can have an inverse relationship with the speed V of the vehicle 100; i.e., as the speed V increases, the time thresholds $T_i$ decrease.

Next, in a decision block 725, the computer 102 determines whether the gaze direction of the operator is in the permitted area A. The computer 102 compares the gaze direction from the block 705 with the permitted area A after the adjustments of the block 715. If an alert has been outputted in a block 745 below for the gaze direction being outside the boundary B of the permitted area A for longer than one of the time thresholds $T_i$, the computer 102 can determine whether the gaze direction of the operator is continuously in the permitted area for at least a resumption time threshold. The resumption time threshold can be chosen to be sufficiently long for the operator to understand a road and traffic situation, as based on experimental testing of operators. If the alert has been outputted, the computer 102 may additionally require that the operator provide an input e.g., place their hands on the steering wheel, tap a brake pedal, provide an input to the user interface 116, etc. If the gaze direction is within the boundary B of the permitted area A (for at least the resumption time threshold if applicable), the process 700 proceeds to a block 730. If the gaze direction is outside the boundary B of the permitted area A (for at least the resumption time threshold if applicable), the process 700 proceeds to a block 735.

In the block 730, the computer 102 resets a counter to zero. The counter tracks how long the gaze direction of the operator is outside the permitted area A. Whenever the gaze direction of the operator returns to the permitted area A as determined in the decision block 725, the counter resets to zero in this block 730. After the block 730, the process 700 proceeds to a decision block 750.

In the block 735, the computer 102 increments the counter. In other words, the counter counts upward since the last time the counter was reset in the block 730. The counter thus tracks a time that the gaze direction is continuously outside the permitted area A, i.e., a time that the gaze direction is outside the permitted area A without interruption.

Next, in a decision block 740, the computer 102 determines whether the counter is at one of the time thresholds, i.e., whether a value t of the counter equals, e.g., $T_1$ or $T_2$ or $T_3$. If the value t of the counter is at one of the time thresholds $T_i$, the process 700 proceeds to the block 745. If the value t of the counter is not equal to any of the time thresholds $T_i$, the process 700 proceeds to the decision block 750.

In the block 745, the computer 102 outputs an alert to the operator. The alert is at least one of audible, visual, or haptic. For example, the computer 102 can instruct the user interface 116 to display a message and/or symbol in the instrument cluster and/or to sound a beep or chime. The alert could additionally be haptic, e.g., vibrating a seat in which the operator is sitting. After the block 745, the process 700 proceeds to the decision block 750.

In the decision block 750, the computer 102 determines whether the trigger condition is no longer occurring. For example, if the trigger condition was the lane-keeping operation, the trigger condition ceases when the operator provides an input via the user interface 116 to deactivate the lane-keeping operation. If the trigger condition is the vehicle 100 being in a forward gear, the trigger condition ceases when the vehicle 100 is put into a nonforward gear, e.g., park, neutral, or reverse. If the trigger condition is the vehicle 100 traveling forward, the trigger condition ceases when the vehicle 100 is stopped or traveling in reverse. If the trigger condition is still occurring, the process 700 returns to the block 705 to continue receiving the data. If the trigger condition has ceased, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first," "second," "third," and "fourth" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   receive data indicating a gaze direction of an occupant of a vehicle;
   determine whether the gaze direction is in a permitted area defined by a boundary, the permitted area being in a forward direction of travel of the vehicle;
   laterally adjust the boundary of the permitted area based on a longitudinal speed of the vehicle and based on data indicating turning of the vehicle;
   vertically adjust the boundary of the permitted area based on a distance to an intersection; and
   control the vehicle based on whether the gaze direction is in the permitted area.

2. The computer of claim 1, wherein controlling the vehicle includes outputting an alert to the occupant in response to the gaze direction being continuously outside the permitted area for a time threshold.

3. The computer of claim 2, wherein the alert is at least one of audible, visual, and haptic.

4. The computer of claim 2, wherein the instructions further include instructions to adjust the time threshold based on the longitudinal speed of the vehicle and based on the data indicating turning of the vehicle.

5. The computer of claim 4, wherein the time threshold has an inverse relationship with the longitudinal speed of the vehicle.

6. The computer of claim 1, wherein the boundary includes a first portion on a lateral side toward which the vehicle is turning;
   the first portion is at a default position when the vehicle is traveling straight; and
   laterally adjusting the boundary of the permitted area includes moving the first portion of the boundary a second distance from the default position in a direction toward which the vehicle is turning.

7. The computer of claim 6, wherein the second distance has a positive relationship with a yaw rate of the vehicle.

8. The computer of claim 6, wherein the second distance has an inverse relationship with the longitudinal speed of the vehicle.

9. The computer of claim 6, wherein, in response to the data indicating turning of the vehicle being a lane-change instruction or an active status of a turn indicator, the second distance is a preset distance.

10. The computer of claim 6, wherein the boundary includes a second portion on a lateral side away from which the vehicle is turning, and laterally adjusting the boundary of the permitted area includes keeping the second portion of the boundary stationary while the vehicle is turning.

11. The computer of claim 6, wherein the boundary includes a second portion on a lateral side away from which the vehicle is turning, and laterally adjusting the boundary of the permitted area includes moving the second portion of the boundary in the direction toward which the vehicle is turning.

12. The computer of claim 1, wherein the data indicating turning of the vehicle include a steering-wheel angle.

13. The computer of claim 1, wherein the data indicating turning of the vehicle include a lane-change instruction.

14. The computer of claim 1, wherein the data indicating turning of the vehicle include a status of a turn indicator.

15. The computer of claim 14, wherein the status of the turn indicator indicates turning of the vehicle when the status is active up to a time threshold, and the status of the turn indicator does not indicate turning when the status is active for longer than the time threshold.

16. The computer of claim 1, wherein the instructions further include instructions to vertically adjust the boundary of the permitted area based on a grade angle of a road on which the vehicle is traveling.

17. The computer of claim 1, wherein the instructions further include instructions to instruct a steering system of the vehicle to perform a lane-keeping operation, and controlling the vehicle based on whether the gaze direction is in the permitted area occurs while performing the lane-keeping operation.

18. A method comprising:
    receiving data indicating a gaze direction of an occupant of a vehicle;
    determining whether the gaze direction is in a permitted area defined by a boundary, the permitted area being in a forward direction of travel of the vehicle;
    laterally adjusting the boundary of the permitted area based on a longitudinal speed of the vehicle and based on data indicating turning of the vehicle;
    vertically adjusting the boundary of the permitted area based on a distance to an intersection; and
    controlling the vehicle based on whether the gaze direction is in the permitted area.

19. The computer of claim 1, wherein the instructions further include instructions to receive data indicating the longitudinal speed from a speedometer of the vehicle.

* * * * *